INSTRUMENTATION CIRCUIT WITH DIRECT COUPLED AMPLIFIER HAVING TEMPERATURE STABILIZATION
Original Filed July 19, 1965
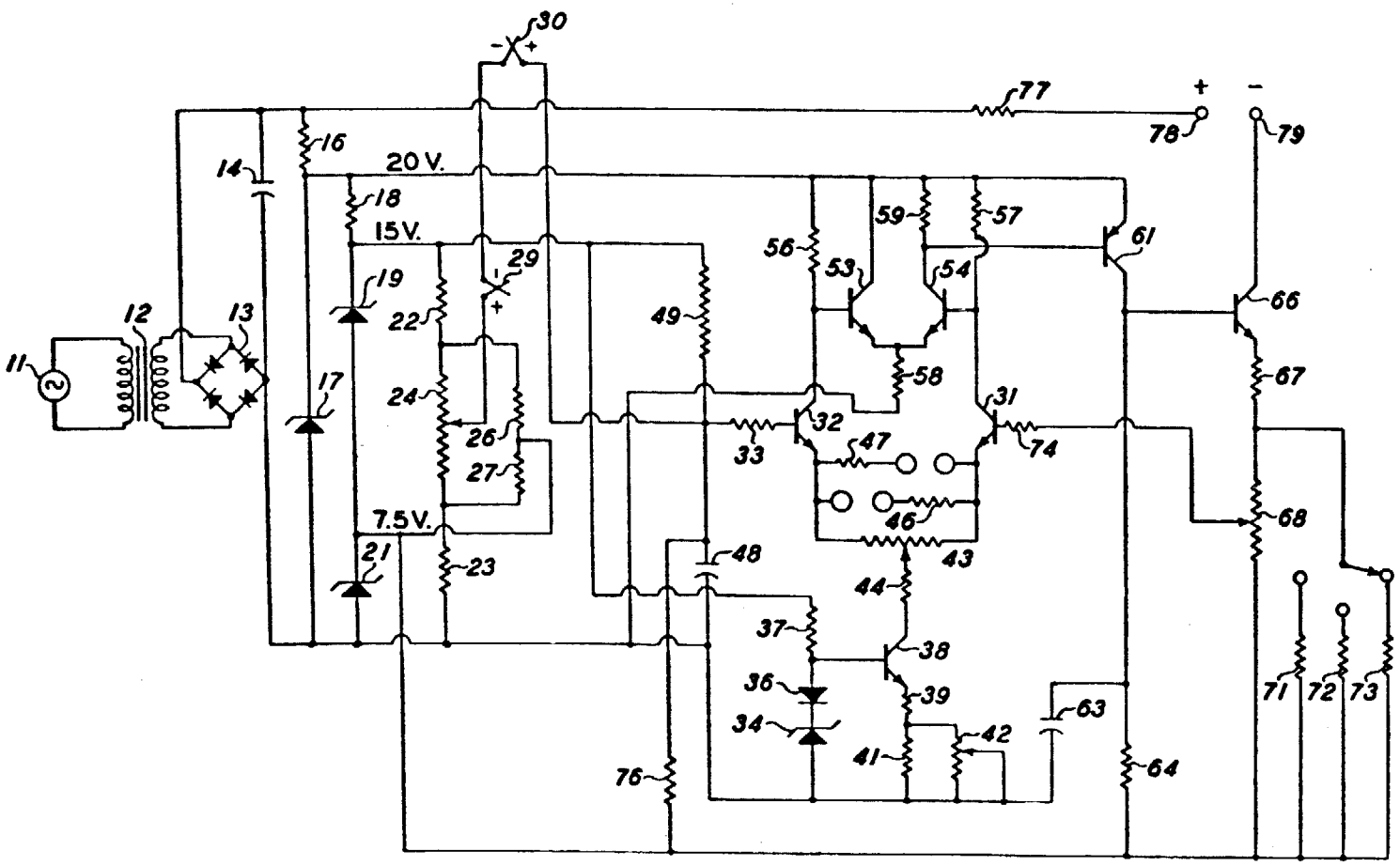

United States Patent Office

Re. 28,184
Reissued Oct. 1, 1974

28,184

INSTRUMENTATION CIRCUIT WITH DIRECT COUPLED AMPLIFIER HAVING TEMPERATURE STABILIZATION

Frederic E. Beck, Rochester, and Eli L. Garelick, Henrietta, N.Y., assignors to Transmation, Inc., Rochester, N.Y.

Original No. 3,486,127, dated Dec. 23, 1969, Ser. No. 472,899, July 19, 1965. Application for reissue Dec. 14, 1971, Ser. No. 207,755

Int. Cl. H03f *3/68*

U.S. Cl. 330—30 D 38 Claims

Matter enclosed in heavy brackets [ ] appears in the original patent but forms no part of this reissue specification; matter printed in italics indicates the additions made by reissue.

ABSTRACT OF THE DISCLOSURE

The disclosure relates to an instrumentation circuit using a [D-C] *direct coupled* amplifier without a chopper which has relatively minimal noise and drift, this being provided by the use of a circuit which corrects for temperature drift and common mode impedance and which can also perform accurately when measuring thermocouple response. The circuit also has provision for offset and thereby amplify the scale of a particular small range of interest.

This invention relates to electronic apparatus and more particularly to an electrical instrumentation circuit.

Now that many industrial processes are becoming automated at an ever increasing pace, a great demand has arisen for extremely accurate, highly flexible sub-systems which can monitor process conditions such as pressure, temperature, liquid level, etc. at remote locations and produce an electrical signal which is accurately representative of these conditions. This signal may then be used for a number of different purposes, for example, it may be employed to trigger an alarm when signal reaches a prearranged level or it may be transmitted to another part of the system which controls the process being monitored, or in fact, the signal may be employed for both purposes. Although this type of circuit may in some instances be employed in very simple systems where it is used to sound an alarm and/or shut down a piece of equipment when temperature or pressure becomes excessive, the equipment which it is being employed to protect and control is generally very expensive capital equipment which is frequently valued in the hundreds of thousands of dollars and accordingly the circuit must be extremely dependable and preferably very [log] *long* lived so as to prevent the shut down of this capital equipment for the replacement of the protective circuit. As the complexity of the total system in which these monitoring circuits are employed grows, the requirement for high dependability in them becomes even more stringent. Thus, for example, as many industries automate their manufacturing processes they frequently employ fairly large numbers of these monitoring circuits in the feed back loop of an overall process control system and where a number of very complex and interrelated factors which are continuously changing have some bearing on the outcome of the process, many of these monitoring circuits are frequently connected as inputs to a computer which reads the monitor outputs and then modifies process conditions accordingly so as to optimize process results. Considering the interrelated operation of the many components in this type of system, the large number of monitoring system frequently used and the expense of shutting down and starting up large, continuous manufacturing processes the requirements for dependability, ease of maintenance, low cost and flexibility become even more apparent.

In the past, monitoring circuits of the type described have generally employed vacuum tube circuits of the mechanical chopper stabilized type. In one type of chopper stabilized prior art monitoring circuit the DC input was chopped to AC, amplified and then demodulated while in another type the input was direct coupled, the error was chopped and a correcting term was then added so that an AC amplifier would correct the drift of the primary DC amplifier. Though one of these two types of chopper stabilized amplifier was generally employed in the prior art in order to achieve adequate stability and accuracy, the use of choppers in these circuits makes them relatively expensive and short lived, while at the same time introducing a frequency response problem and thereby limiting their use to a relatively narrow range so that different units must be designed to cover various ranges. Accordingly, in order to install a complete control system in a continuous manufacturing process such as oil refining their short life and relative lack of reliability is multiplied by the number of units which must be installed and maintenance problems become extremely difficult, time consuming and expensive. In addition, many prior art monitoring circuits suffer from a further lack of flexibility in that they are unable to accept more than one type of input. For example, while one of these circuits may be employed with a variable resistance input such as a strain gage it cannot also be used to monitor a voltage generating input such as a thermocouple. Relatively low input impedance is also a problem with many prior art monitoring circuits.

Accordingly, it is an object of this invention to provide a monitoring circuit which is devoid of the aforementioned deficiencies.

It is further object of this invention to provide an extremely accurate monitoring circuit.

It is also an object of this invention to provide a monitoring circuit with high input impedance.

It is a further object of this invention to provide a monitoring circuit which can accept many different types of inputs.

It is further object of this invention to provide a monitoring circuit of novel design which is both inexpensive to produce and highly dependable.

Yet another object of this invention is to provide a universal output monitoring circuit.

An additional object of this invention is to provide a monitoring circuit whose output can be transmitted to a controlled computer without the necessity of an interface circuit.

It is also an object of the invention to provide a monitoring circuit whose output is extremely stable with varying load resistance.

Yet another object of the invention is to provide a monitoring circuit whose output is extremely stable with changes in ambient temperature and line voltage.

The above and still further objects of the invention are accomplished, generally speaking, by providing a solid state monitoring circuit employing a direct coupled amplifier circuit with a signal generator which exactly compensates for changes in the level of the reference signal and characteristics of the amplifier induced by temperature change in the circuit. The circuit preferably employs a matched pair of transistors in a differential amplifier with a temperature responsive circuit which provides extremely fine compensation for the reference voltage and for small differences in the responses of the two transistors in the differential amplifier as they track the voltage versus, ambient temperature curve. In effect then, the compensating circuit converts the matched transistor pair to a super matched pair while also rendering the net reference signal output insensitive to temperature changes.

When a differential amplifier is employed, a temperature compensated constant current source is preferably also used to aid in stabilizing the amplifier and provide an unchanging offset output signal. Other features of the circuit include a provision for either a variable voltage generating input or a variable resistance input, output span adjustment with adjustable [O] *zero* and null balance circuitry with current feedback to provide a true current output.

The invention will be more clearly understood after reading the following detailed description of an exemplary embodiment thereof and especially when this is read in conjunction with the accompanying drawings wherein:

The figure is a schematic circuit diagram illustrating an exemplary embodiment of the invention.

Referring now to the drawing it is seen that a conventional 117 volt AC power source 11 is connected to the primary winding of a transformer 12, the secondary winding of which is connected to a full wave diode rectifier 13. A capacitor 14 shunts the output of the full wave rectifier to smooth the output wave and remove excessive ripple therefrom. The output of this power supply is also applied across a current limiting resistor 16 connected in series with a 20 volt Zener diode 17. The 20 volt output across Zener diode 17 is applied across a second current limiting resistor 18 connected in series with two 7.5 volts Zener diodes 19 and 21. The two diodes are employed here to provide 7.5 and 15 volt sources. It is of course, to be understood that these elements constitute the power supply for the system and accordingly they may be replaced by any suitable equivalent capable of providing the required power. It is also to be understood, that all of the values herein for voltages, currents, resistances, etc. in this power supply circuit and throughout the remainder of the circuit are exemplary only, and may be varied with variations in other component changes in input or output requirements, etc. It also should be understood, that many of the solid state components in this circuit such as the diodes in the full wave rectifier, may be replaced by their vacuum tube or other equivalents while still coming within the scope of the invention. In addition to its use as an initial reference stage to feed the 15 volt Zener diode voltage regulator pair, the 20 volt source is used to feed the differential amplifier and the first gain stage as brought out more fully hereinafter. Connected in series across the 15 volt line are two nominal 499 ohm resistors 22 and 23 and a ten ohm potentiometer 24. Two matched temperature sensitive resistors 26 and 27 are connected in series across potentiometer 24 and a point between resistor 26 and 27 is connected above Zener diode 21 so that a 7.5 volt potential is applied to this point in the bridge. Any suitable temperature sensitive resistors such as wound copper may be employed as resistors 26 and 27. The wiper of potentiometer 24 is connected to a reference or "cold junction" thermocouple 29 which in turn is connected in series with the monitoring thermocouple 30. It should be noted that reference thermocouple 29 is connected to buck monitoring thermocouple 30. Resistors 26 and 27 have a positive temperature coefficient, however two negative coefficient elements may be used with equal results. One of the functions of these resistors is to introduce a signal which is of equal magnitude but opposite in direction from the signal error caused by the change in temperature of the reference thermocouple.

The compensating circuit is also employed to compensate for temperature change induced signal errors in the matched pair of transistors in the first stage of the differential amplifier, because no matter how carefully these transistor pairs are matched they generally track the output voltage versus temperature plot along different lines. Since either one of the matched pair of transistors 31 and 32 may tend to produce higher voltage outputs with increasing temperature than the other and the direction of signal error in the completed circuit is unpredictable, the temperature compensating portion of the circuit is bi-directional. Accordingly, if the wiper on the ten ohm potentiometer is set at the exact center of its range and resistors 26 and 27 are exactly equal in value then the temperature coefficient introduced by the network is 0. If however, the ten ohm resistor is moved in a direction such as to short out a portion of one or the other of the resistors then either a positive or negative voltage is introduced with temperature. This voltage appears in series with the reference thermocouple and acts as an additional signal input. After the circuit is completely built and tested at the various temperatures which it will encounter in use, the potentiometer 24 is set so as to compensate for both the signal error introduced by changes in temperature of the reference thermocouple and for those introduced by changes in temperature of matched pair 31–32. So long as reference thermocouple 29, temperature, compensating resistors 26 and 27 and the matched transistor pair 31–32 are all included together within a fairly small case so that they all undergo approximately the same changes in temperature, satisfactory compensation will be introduced. However, for best results, these elements should be placed as close together physically as possible in the unit and for optimum performance they may be encapsulated together, as for example, in an epoxy resin so that they will all be retained at almost exactly the same temperature when the device is in operation. The lead of monitoring thermocouple 30, most remote from reference thermocouple 29 is connected to the base of transistor 32 which in conjunction with transistor 31 forms the first stage of a direct coupled differential amplifier. A Zener diode 34, a diode 36 and a 10K resistor 37 are all connected in series across the fifteen volt regulated supply provided by the two Zeners 19 and 21. The base of a transistor 38 is connected to a point between diode 36 and resistor 37 while the emitter of transistor 38 is connected to the base of the 15 volt line through a 25K resistor 39 and a temperature sensitive resistor 41. Resistor 41 is also shunted with a variable resistance 42. The collector of transistor 38 is connected to the wiper of potentiometer 43 through a 100 ohm resistor 44. The potentiometer 43 is in series with the emitters of transistors 31 and 32. A 499 ohm resistor 46 and a 1K resistor 47 are also provided as open circuit shunts across the potentiometer so that by closing either one or both of these shunts the range of the potentiometer may be widely varied. Elements 34 through 47 provide a temperature compensated constant current source for the differential amplifier so that the necessary degree of stability is provided to allow for direct coupling of the differential amplifier. Zener 34 is provided primarily for close regulation of the base to emitter supply voltage across transistor 38 so as to stabilize its current output. Since the base to emitter voltage across transistor 38 has a relatively large temperature coefficient while the Zener 34 has only a small positive temperature coefficient, diode 36 in series with the Zener is provided because it has a temperature coefficient which is essentially equal to that of the base to emitter coefficient of transistor 38. In order to provide exactly balanced temperature stability, temperature sensitive resistor 41 is provided with a positive temperature coefficient and is shunted with potentiometer 42. This constant current source may be precisely balanced by measuring the voltage across the output resistor 44 with changes in ambient temperature and adjusting the wiper on potentiometer 42 until there is no change in voltage across resistor 44 with changes in temperature. Any suitable temperature sensitive resistor may be used as element 41. Potentiometer 43 is employed for zero adjustment. That is to say, it is employed to unbalance the differential amplifier so as to provide a preselected output level for a zero input. It is generally desirable in the control industry that a preselected output such as a 4 milliamps be provided even for a zero input as an indication that the monitoring circuit is operative. By leaving open or closing either one or both of shunting resistors 46 and 47, zero adjusting potentiometer 43 may be readily employed to adjust the output current provided with zero input to one milliamp, four milliamps, ten milliamps, etc. Other shunts may also be provided to extend the range, improve the resolution or otherwise change this adjustment.

A large capacitor 48 is connected from the input lead of the base of transistor 32 to common so as to filter out any ripple on the input signal as it is fed into the transistor base. Also applied to the base of a transistor 32 is a signal from resistor 49 which is tied to the 15 volt supply so as to provide the initial offset base current for the collector current of that transistor. The collector output of transistors 31 and 32 are connected to the bases of the second stage transistors 53 and 54 and are also connected to the 20 volt line regulated by Zener 17 through two 100K resistors 56 and 57 which load the first stage. The common emitters of transistors 53 and 54 are connected to the common base line through a 220K transistor 58. The collector of transistor 54 is also connected to the 20 volt line through a 100K resistor 59. The output of this collector drives transistor 61, a PNP stage which provides considerable voltage gain. The collector of this stage is connected to the base of transistor 66 and also to a 4.7 mfd. capacitor 63 and a 22K resistor 64 which forms a filter network to further reduce noise and any AC response which might have been introduced into the system and at the same time prevent the system from oscillating. Transistor 66 forms the output stage which supplies the output current through [fedeback] *feedback* resistors 67 and 68. Feedback resistor 68 is a potentiometer so that a portion of the feedback signal may be selected by manipulation of the wiper on the potentiometer. The potentiometer itself may be shunted by anyone or more of three optional shunting resistors 71, 72 or 73 of 15, 3 and 1.5 ohms respectively so as to enable setting of the output span range. Thus by merely shunting with the proper resistors here any one of the standard output span ranges can be provided. In effect then, the output span range is controlled by controlling the amount of feedback in the circuit. The wiper of potentiometer 68 is connected to the base of transistor 31 through a ten ohm resistor 74 to complete the feedback loop. A large value resistor 76 connects the 7.5 volt base line to the input of the base of transistor 32 of the difference amplifier so as to slowly drain filter capacitor 48 to prevent it from charging to the full 15 volt level on open circuit.

When signal generating inputs (generally in the millivolt range) other than thermocouple 30 are employed the reference thermocouple 29 is also removed from the circuit or shorted and the circuit may then be readjusted for temperature compensation according to the procedure described above.

It is also to be noted, that this circuit may be employed to monitor electrical elements which do not generate a signal of their own and any suitable condition responsive, variable impedance may be monitored by the circuit, such as temperature sensitive resistors. Thus, for example, in monitoring the variation in resistance with temperature change of such a resistor the thermocouple 30 and reference thermocouple 29 are removed from the circuit and the temperature sensitive resistance is connected in series with a resistor between 7.5 volts and 15 volt lines. [The connection of this resistors is connected] *The junction of these two resistors is connected to the end of* resistor 33 which is most remote from the base of transistor 32. In this way the power supply of the circuit itself applies a voltage across the variable impedance being monitored and the current flow through the impedance is then proportional to the temperature being monitored. In other words, the circuit has a built in power supply for any element being monitored which does not itself generate a voltage.

The output of the circuit described is taken across terminals 78 and 79 with terminal 78 being connected to one side of the full wave rectifier 13 through a power limiting resistor 77 which prevents over loading of the circuit. The other terminal 79 of the output is connected to the collector of transistor 66.

Regardless of whether the circuit is used to monitor a thermocouple, another signal generating input or condition responsive impedance, the signal produced is compared against a reference signal of one type or another. This reference may consist of the output of a reference thermocouple, an offset voltage or some other source. In addition to these sources, other thermocouple sources are generally formed in the circuit inadvertently at solder connections or other junctions thus introducing in all cases at east a "reference" signal error caused by temperature change of these junctions. The adjustable compensating circuit accordingly corrects for input signal error caused by temperature change of the reference voltage source and, the inadvertent thermocouples as well as for temperature induced changes in the amplifier characteristics and this compensation of compensation in the constant current source for the amplifier which is separately provided so compensation is accurately provided over a wide range of ambient temperatures, without interaction.

It is of course to be understood, that the specific circuit described above is only illustrative of the invention and that many other changes, modifications, additions and the like which still come within the scope and spirit of the invention will be obvious to those skilled in the art upon review of the specification. It is of course intended that these be included within the invention.

When used throughout the specification and claims the phase "condition responsive voltage generating input" is to be taken to include not only those elements which generate a voltage internally in response to changes in ambient conditions but also those which change their impedance and are connected across the power supply of the monitoring circuit.

What is claimed is:

[1. A monitoring circuit comprising a D-C amplifier, a condition responsive signal input and a feedback voltage generating input directly coupled to said amplifier, said feedback voltage generating input and said amplifier having output characteristics which vary with temperature, and a compensating voltage generating means directly coupled to said amplifier, said compensating voltage generating means having an output which varies with temperature in such a way as to offset the net change in the output of said amplifier caused by variations in the characteristics of said amplifier and the output of said feedback voltage generating input induced by variations in temperature.]

[2. A monitoring circuit according to claim 1 in which said condition responsive voltage generating input is a thermocouple.]

[3. A monitoring circuit according to claim 1 in which said compensating voltage generating means is bi-directionaly variable.]

[4. A monitoring circuit according to claim 1 further including a power supply and in which said condition responsive voltage generating input comprises a condition responsive variable impedance connected across an output from said power supply.]

[5. A monitoring circuit according to claim 1 in which said amplifier is a differential amplifier.]

[6. A monitoring circuit according to claim 5 further including a temperature compensated constant current source for said differential amplifier.]

[7. A monitoring circuit according to claim 6 in which said constant current source comprises a transistor with its emitter connected in series with a temperature sensitive resistor and a closely regulated input voltage connected across said resistor and the base of said transistor.]

[8. A monitoring circuit according to claim 6 in which said constant current source comprises a transistor with its emitter connected in series with a temperature sensitive resistor a potential source connected across said resistor and the base of said transistor, a variable resistor shunting said temperature sensitive resistor with the voltage variation of said temperature sensitive resistor and the base to emitter voltage variation of said transistor being larger in sum than that of said potential source whereby exact temperature compensation may be achieved in said constant current source by adjustment of said variable shunting resistor.]

[9. A monitoring circuit according to claim 1 in which said feedback voltage generating input and amplifier and said compensating voltage generating means are physically adjacent to each other.]

[10. A monitoring circuit according to claim 2 in which said thermocouple is remote from said monitoring circuit and further including a reference signal input in said monitoring circuit summed with said signal input to buck the output of said signal input.]

11. A monitoring circuit for a condition responsive voltage generating input, at least one condition responsive element of which is apart from said monitoring circuit comprising a differential amplifier directly coupled to said input and to a reference signal generating input, a compensating voltage generating input directly coupled with said amplifier, said compensating input containing a bi-directionally adjustable temperature sensitive network so that the output voltage which it generates upon changes in temperature can be varied to compensate exactly for temperature induced variations in said reference signal and temperature induced mismatch in said differential amplifier and a temperature compensated constant current source for said differential amplifier, said constant current source comprising a transistor with its emitter connected in series with a temperature sensitive resistor, a potential source connected across said resistor and the base of said transistor, a variable resistor shunting said temperature sensitive resistor with the voltage variation of said temperature sensitive resistor and the base to emitter variation of said transistor being larger in sum than that of said potential source whereby exact temperature compensation may be achieved in said constant source by adjustment of said variable shunting resistor.

12. A monitoring circuit for a remote thermocouple comprising a reference thermocouple connected to buck the output of said remote thermocouple, the combined output of said two thermocouples being directly coupled to a differential amplifier with a temperature compensated constant current source, and a second voltage generating input directly coupled to said amplifier, said second input containing a bi-directionally adjustable temperature sensitive network so that the output voltage which it generates upon changes in temperature can be varied, said reference thermocouple, the temperature sensitive [resistors in said bridge] *network* and said differential amplifier being closely adjacent each other so that said network may be adjusted to compensate exactly for changes in the output of said reference thermocouple and mismatch in said amplifier induced by changes in ambient temperature of said monitoring circuit, said constant current source comprising a transistor with its emitter connected in series with a temperature sensitive resistor, a potential source connected across said resistor and the base of said transistor, a variable resistor shunting said temperature sensitive resistor with the voltage variation of said temperature sensitive resistor and the base to emitter voltage variation of said transistor being larger in sum than that of said potential source whereby exact temperature compensation may be achieved in said constant current source by adjustment of said variable shunting resistor.

*13. A monitoring circuit comprising the combination of a direct coupled amplifier having output characteristics which vary with temperature, a condition responsive signal input direct coupled to said amplifier, means for compensating for a predetermined characteristic of said condition responsive signal input, said means having a temperature dependent output and being direct coupled to said amplifier and means responsive to temperature caused changes in said amplifier and said means for compensating for a predetermined characteristic for generating a compensating signal to simultaneously compensate said amplifier and said means for compensating for predetermined characteristic.*

*14. A monitoring circuit as set forth in claim 13, said amplifier further including an input and output and feedback means coupled between the output of said amplifier and the input thereof.*

*15. A monitoring circuit as set forth in claim 14 further including means in said feedback means for providing different output ranges.*

*16. A monitoring circuit as set forth in claim 13 said amplifier further including means at the output thereof for providing a single ended high output resistance for providing a current output unaffected by load variations.*

*17. A monitoring circuit as set forth in claim 14 said amplifier further including means at the output thereof for providing a single ended high output resistance for providing a current output unaffected by load variations.*

*18. A monitoring circuit according to claim 13 in which said compensating voltage generating means is bi-directionally variable.*

*19. A monitoring circuit according to claim 14 in which said compensating voltage generating means is bi-directionally variable.*

*20. A monitoring circuit according to claim 13 in which said amplifier includes a differential amplifier.*

*21. A monitoring circuit according to claim 14 in which said amplifier includes a differential amplifier.*

*22. A monitoring circuit according to claim 19 in which said amplifier includes a differential amplifier.*

*23. A monitoring circuit according to claim 13 in which said means for compensating said amplifier and said compensating signal generating means are thermally coupled to each other.*

*24. A monitoring circuit according to claim 14 in which said means for compensating said amplifier and said compensating signal generating means are thermally coupled to each other.*

*25. A monitoring circuit according to claim 22 in which said means for compensating said amplifier and said compensating signal generating means are thermally coupled to each other.*

*26. A monitoring circuit as set forth in claim 21 wherein said differential amplifier has a differential input and a single ended output.*

*27. A monitoring circuit as set forth in claim 22 wherein said differential amplifier has a differential input and a single ended output.*

*28. A monitoring circuit comprising the combination of a direct coupled amplifier having output characteristics which vary with temperature, a thermocouple input direct coupled to said amplifier, a cold junction having a temperature dependent output and being direct coupled to the input of said amplifier and means responsive to temperature caused changes in said amplifier and said cold junction for generating a compensating signal to simultaneously compensate said amplifier and said cold junction.*

*29. A monitoring circuit as set forth in claim 28, said amplifier further including an input and output and feedback means coupled between the output of said amplifier and the input thereof.*

*30. A monitoring circuit as set forth in claim 29 further including means in said feedback means for providing different output ranges.*

*31. A monitoring circuit as set forth in claim 28 said amplifier further including means at the output thereof for providing a single ended high output resistance for providing a current output unaffected by load variations.*

*32. A monitoring circuit as set forth in claim 29 said amplifier further including means at the output thereof for providing a single ended high output resistance for providing a current output unaffected by load variations.*

*33. A monitoring circuit according to claim 28 in which said compensating voltage generating means is bi-directionally variable.*

*34. A monitoring circuit according to claim 29 in which said compensating voltage generating means is bi-directionally variable.*

*35. A monitoring circuit according to claim 28 in which said amplifier includes a differential amplifier.*

*36. A monitoring circuit according to claim 29 in which said amplifier includes a differential amplifier.*

*37. A monitoring circuit according to claim 34 in which said amplifier includes a differential amplifier.*

*38. A monitoring circuit according to claim 28 in which said means for compensating said amplifier and said compensating signal generating means are thermally coupled to each other.*

*39. A monitoring circuit according to claim 29 in which said means for compensating said amplifier and said compensating signal generating means are thermally coupled to each other.*

*40. A monitoring circuit according to claim 37 in which said means for compensating said amplifier and said compensating signal generating means are thermally coupled to each other.*

*41. A monitoring circuit as set forth in claim 36 wherein said differential amplifier has a differential input and a single ended output.*

*42. A monitoring circuit as set forth in claim 37 wherein said differential amplifier has a differential input and a single ended output.*

*43. A monitoring circuit according to claim 20 further including a temperature compensated constant current source for said differential amplifier.*

*44. A monitoring circuit according to claim 43 in which said constant current source comprises a transistor with its emitter connected in series with a temperature sensitive resistor and a closely regulated input voltage connected across said resistor and the base of said transistor.*

*45. A monitoring circuit according to claim 44 in which said constant current source comprises a transistor with its emitter connected in series with a temperature sensitive resistor a potential source connected across said resistor and the base of said transistor, a variable resistor shunting said temperature sensitive resistor with the voltage variation of said temperature sensitive resistor and the base to emitter voltage variation of said transistor being larger in sum than that of said potential source whereby exact temperature compensation may be achieved in said constant current source by adjustment of said variable shunting resistor.*

*46. A monitoring circuit according to claim 35 further including a temperature compensated constant current source for said differential amplifier.*

*47. A monitoring circuit according to claim 46 in which said constant current source comprises a transistor with its emitter connected in series with a temperature sensitive resistor and a closely regulated input voltage connected across said resistor and the base of said transistor.*

*48. A monitoring circuit according to claim 47 in which said constant current source comprises a transistor with its emitter connected in series with a temperature sensitive resistor a potential source connected across said resistor and the base of said transistor, a variable resistor shunting said temperature sensitive resistor with the voltage variation of said transistor being larger in sum than that of said potential source whereby exact temperature compensation may be achieved in said constant current source by adjustment of said variable shunting resistor.*

References Cited

The following references, cited by the Examiner, are of record in the patented file of this patent or the original patent.

UNITED STATES PATENTS

| | | | |
|---|---|---|---|
| 3,046,487 | 7/1962 | Matzen et al. | 330—69 X |
| 3,283,579 | 11/1966 | Josephs | 73—359 |
| 3,290,520 | 12/1966 | Wennik | 330—69 X |
| 3,305,734 | 2/1967 | Buttenhoff | 330—30 X |

HERMAN KARL SAALBACH, Primary Examiner

L. J. DAHL, Assistant Examiner

U.S. Cl. X.R.

330—23, 28, 30 R, 69